(12) United States Patent
Kwon et al.

(10) Patent No.: US 9,568,057 B2
(45) Date of Patent: Feb. 14, 2017

(54) ELECTRONIC PARKING BRAKE

(71) Applicant: HYUNDAI MOBIS CO., LTD., Seoul (KR)

(72) Inventors: Yong Sik Kwon, Seoul (KR); Jong Sung Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 14/803,402

(22) Filed: Jul. 20, 2015

(65) Prior Publication Data
US 2016/0017942 A1    Jan. 21, 2016

(30) Foreign Application Priority Data

Jul. 21, 2014    (KR) .................. 10-2014-0091914

(51) Int. Cl.
| *B60T 1/00* | (2006.01) |
| *F16D 65/18* | (2006.01) |
| *F16D 121/24* | (2012.01) |
| *F16D 125/48* | (2012.01) |
| *F16D 125/40* | (2012.01) |
| *F16D 127/06* | (2012.01) |

(52) U.S. Cl.
CPC .......... *F16D 65/18* (2013.01); *F16D 2121/24* (2013.01); *F16D 2125/40* (2013.01); *F16D 2125/48* (2013.01); *F16D 2127/06* (2013.01)

(58) Field of Classification Search
CPC .......... F16D 65/18; F16D 65/22; F16D 51/28; F16D 2121/24; F16D 63/006; B60T 1/005; B60T 13/74

USPC   188/31, 165, 154–164; 192/219.5; 74/411.5
See application file for complete search history.

(56) References Cited

U.S. PATENT DOCUMENTS

| 6,267,207 B1 * | 7/2001 | Fleischer ................ B60T 7/107 188/106 P |
| 7,299,905 B2 * | 11/2007 | Yamaguchi ............. B60T 13/02 188/156 |
| 8,056,683 B2 * | 11/2011 | Usui ....................... F16D 65/18 188/156 |
| 2007/0039798 A1 * | 2/2007 | Kim .................... F16H 63/3416 192/219.5 |
| 2007/0151816 A1 * | 7/2007 | Gil ........................ B60T 11/046 188/2 D |
| 2008/0217123 A1 * | 9/2008 | Fujita ..................... B60T 1/005 188/161 |
| 2014/0000992 A1 * | 1/2014 | Tajima .................... F16D 65/18 188/72.1 |

FOREIGN PATENT DOCUMENTS

KR    10-2012-0000838 A    1/2012

* cited by examiner

*Primary Examiner* — Christopher Schwartz
(74) *Attorney, Agent, or Firm* — Knobbe Martens Olson & Bear LLP

(57) ABSTRACT

An electronic parking brake (EPB) may include: a housing unit; a motor unit installed in the housing unit; a deceleration unit connected to the motor unit so as to transfer power; a spindle unit connected to the deceleration unit so as to receive power from the deceleration unit, and moving a brake pad; a locking unit mounted in the housing unit and having a length which is adjusted to restrict operation of the motor unit; a sensing unit sensing an operation state of the motor unit; and a control unit receiving a sensing signal of the sensing unit and a parking signal, and controlling the operation of the motor unit.

8 Claims, 8 Drawing Sheets

ELECTRONIC PARKING BRAKE

CROSS-REFERENCES TO RELATED APPLICATIONS

The present application claims priority to Korean application number 10-2014-0091914, filed on Jul. 21, 2014, which is incorporated by reference in its entirety.

BACKGROUND OF THE INVENTION

The present invention relates to an electronic parking brake (EPB), and more particularly, to an EPB which is capable of simplifying the configuration and additionally pressurizing a wheel disk during a parking brake operation.

In general, a brake system refers to a brake device which is used to not only decelerate or stop a vehicle in operation, but also maintain a parking state. Such a brake system typically uses a friction brake which converts kinetic energy into thermal energy. The friction brake performs a braking function while a brake pad pressurizes both sides of a wheel disk using hydraulic pressure, the wheel disk being rotated with a wheel. Since the hydraulic brake has a structure of strongly pushing the pad toward the disk using hydraulic pressure during a braking operation, the hydraulic brake inevitably has a complex structure including a master cylinder, a hydraulic line, and various devices. The master cylinder is operated through a booster for boosting a pedal force, and generates hydraulic pressure. The hydraulic line is connected toward a wheel cylinder, and the various devices control and assist the master cylinder and the hydraulic line. Furthermore, the hydraulic brake has a limitation in improving the reliability and stability of braking performance due to the complexity of the structure and the use of hydraulic pressure.

Recently, there has been used an EMB (Electro Mechanical Brake) which has a simpler structure and higher reliability in braking performance than the hydraulic brake. When an ECU (Electronic Control Unit) receiving electronic pedal information drives a motor to generate an axial moving force during a braking operation, a nut piston coupled to a motor is moved toward a brake pad, and the brake pad receiving the axial moving force of the nut piston is moved toward a wheel disk and generates a braking force by pressurizing the wheel disk.

However, since the EMB includes a decelerator and a non-self locking piston, the EMB has a complex structure. When various functions such as an EPB function are added, such a complex mechanism may become larger and heavier than a hydraulic caliper. Furthermore, as the entire structure becomes complex, the vehicle mountability may be degraded. Thus, there is a demand for a structure capable of solving such a problem.

The related art of the present invention is disclosed in Korean Patent Laid-open Publication No. 2012-0000838 published on Jan. 4, 2012 and entitled "Electronic parking brake device".

SUMMARY OF THE INVENTION

Embodiments of the present invention are directed to an electronic parking brake (EPB) which is capable of simplifying the configuration of an EPB function added to an EMB using a motor driving force as a disk driving force, and performing an additional braking operation during parking.

In one embodiment, an electronic parking brake (EPB) may include: a housing unit; a motor unit installed in the housing unit; a deceleration unit connected to the motor unit so as to transfer power; a spindle unit connected to the deceleration unit so as to receive power from the deceleration unit, and moving a brake pad; a locking unit mounted in the housing unit and having a length which is adjusted to restrict operation of the motor unit; a sensing unit sensing an operation state of the motor unit; and a control unit receiving a sensing signal of the sensing unit and a parking signal, and controlling the operation of the motor unit.

The motor unit may include: a driving motor mounted in the housing unit, and driven according to a control signal of the control unit; a driving shaft coupled to the driving motor and rotated in both directions; a driving gear mounted on the driving shaft, and engaged with the deceleration unit; and a driving plate mounted on the driving shaft, and locked to the locking unit so as to restrict the rotation of the driving shaft.

The driving gear and the driving plate may be mounted on the driving shaft, and the driving plate may be arranged closer to the driving motor than the driving gear.

The driving plate may include: a rotating body having a central part through which the driving shaft is passed, and including a plurality of polygonal surfaces formed at the edge thereof such that the rotating body has a polygonal shape; and a protruding body protruding from an end of each of the polygonal surfaces and capable of being locked to the locking unit.

The locking unit may include: a fixed part installed in the housing unit; and a moving part installed to be advanced from or retreated into the fixed part.

The moving part may protrude toward the driving plate when advanced from the fixed part.

When the moving part protrudes toward the driving plate, the driving plate may be restricted from rotating in the other direction while the protruding body is locked to the moving part in case where the driving plate is rotated in the other direction.

When the moving part protrudes toward the driving plate, the driving plate may be rotated in one direction while the polygonal surface pushes the moving part in case where the driving plate is rotated in the one direction.

The moving part may have a sharp contact part formed at an end thereof so as to reduce a contact area between the moving part and the polygonal surface.

The exterior of the driving shaft and an angled hole of the rotating body through which the driving shaft is passed may have the same shape, and the shape is not a circular shape.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
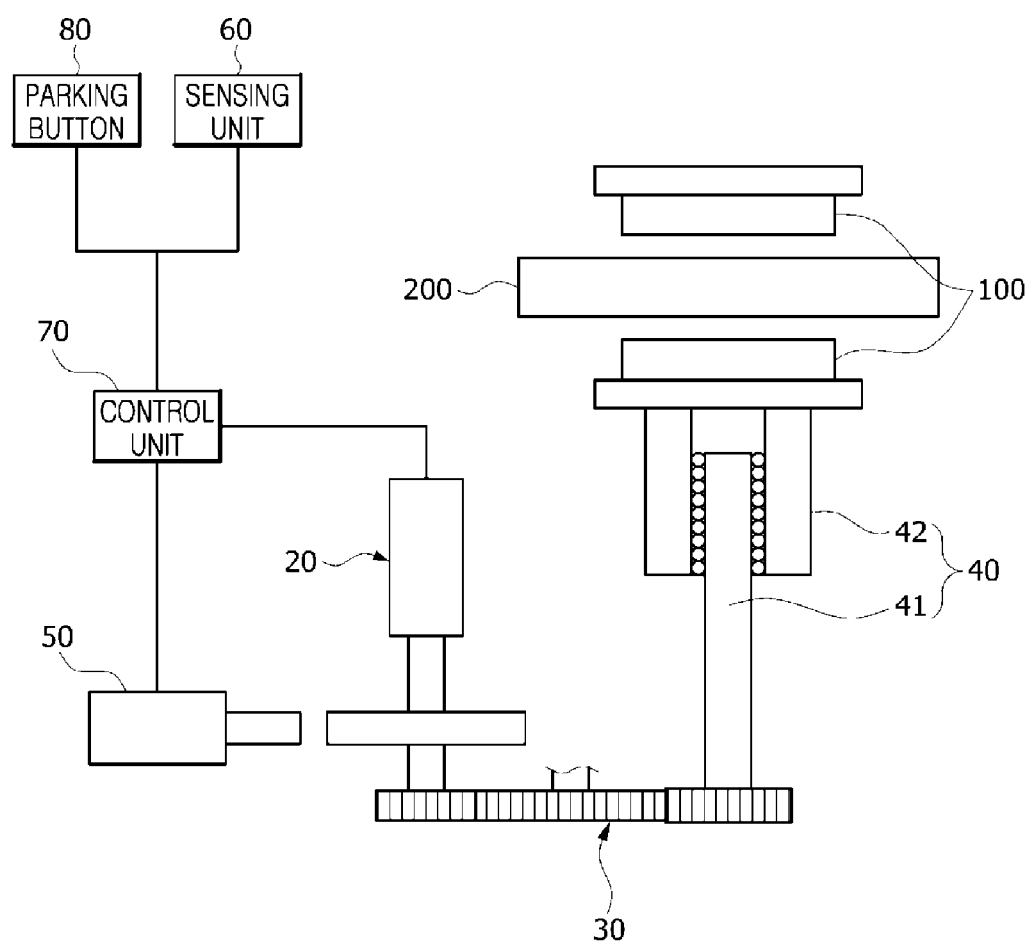
FIG. 1 schematically illustrates the entire configuration of an EPB (Electronic Parking Brake) in accordance with an embodiment of the present invention.
Figure 2:
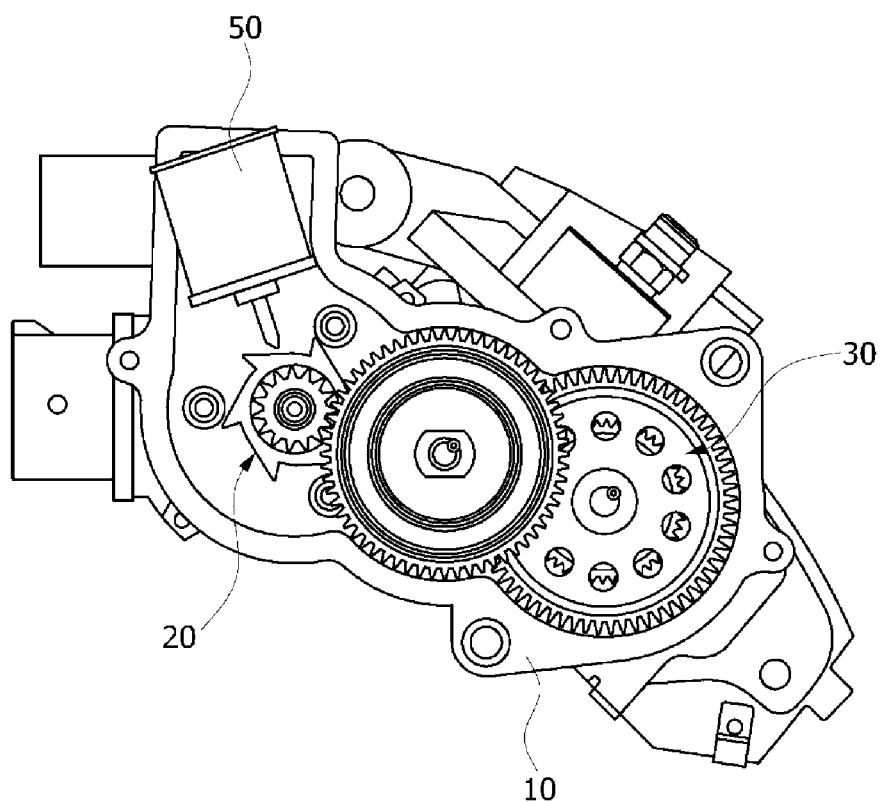
FIG. 2 schematically illustrates a state in which parts are embedded in a housing unit in the EPB in accordance with the embodiment of the present invention.

FIG. 1 schematically illustrates the entire configuration of an EPB (Electronic Parking Brake) in accordance with an embodiment of the present invention. FIG. 2 schematically illustrates a state in which parts are embedded in a housing unit in the EPB in accordance with the embodiment of the present invention.

Referring to FIGS. 1 and 2, the EPB 1 in accordance with the embodiment of the present invention may include a housing unit 10, a motor unit 20, a deceleration unit 30, a spindle unit 40, a locking unit 50, a sensing unit 60, and a control unit 70. The EPB 1 in accordance with the embodiment of the present invention may be mounted in connection with an EMB (Electro Mechanical Brake) or mounted independently of the EMB. At this time, the housing unit 10 having a plurality of parts embedded therein may be mounted on a vehicle wheel.

The motor unit 20 and the deceleration unit 30 may be installed in the housing unit 10. The motor unit 20 may generate power as power is applied, and the deceleration unit 30 may transfer the power generated from the motor unit 20 through connections among a plurality of gears.

The spindle unit 40 may be connected to the deceleration unit 30 so as to receive the power. In the present embodiment, the spindle unit 40 may include a screw shaft 41 and a nut piston 42. The screw shaft 41 may be rotated in a state where it is connected to the deceleration unit 30, and the nut piston 42 may be moved in an axial direction along the rotation direction of the screw shaft 41. The screw shaft 41 and the nut piston 42 may be coupled through a ball or roller-type screw, or formed with an NSL (Non-Self Locking)-type screw in order to minimize a frictional force during rotation and axial movement.

The brake pad 100 may be provided in the housing unit 10 which is installed to surround a wheel disk 200, and moved to pressurize the wheel disk 200 when the motor unit 20 is driven, thereby realizing a parking brake state.

The locking unit 50 may be mounted in the housing unit 10, and have a length which is adjusted to restrict the operation of the motor unit 20. The length of the locking unit 50 may be increased or decreased. When the length of the locking unit 50 is increased to pressurize the motor unit 20, the locking unit 50 may restrict the motor unit 20 from rotating in the other direction.

The sensing unit 60 may sense the operation state of the motor unit 20. The sensing unit 60 may sense whether the brake pad 100 is moved to a preset position through the operation of the motor unit 20. For example, the sensing unit 60 may be mounted in the housing unit 10 so as to measure the moving distance of the nut piston 42.

The control unit 70 may receive a sensing signal of the sensing unit 60, and control the operation of the motor unit 20. The control unit 70 may receive a parking signal generated through an operation for a parking button 80, and control the operation of the motor unit 20. For example, when the motor unit 20 is rotated in one direction according to control of the control unit 70 receiving the parking signal, the nut piston 42 may be moved to attach the brake pad 100 to the wheel disk 200.

At this time, the sensing unit 60 may measure the moving distance of the nut piston 42, and determine whether the nut piston 42 was moved to the preset position. When the nut piston 42 does not reach the preset position, the control unit 70 may control the motor unit 20 to additionally move the nut piston 42.

Thus, in the EPB 1 in accordance with the embodiment of the present invention, the control unit 70 receiving the parking signal generated through the parking button 80 may drive the motor unit 20 to rotate the deceleration unit 30, thereby moving the spindle unit 40 in the axial direction. Then, the brake pad 100 may pressurize the wheel disk 200 through the spindle unit 40 moved in the axial direction, and form a parking brake force.

Figure 3:
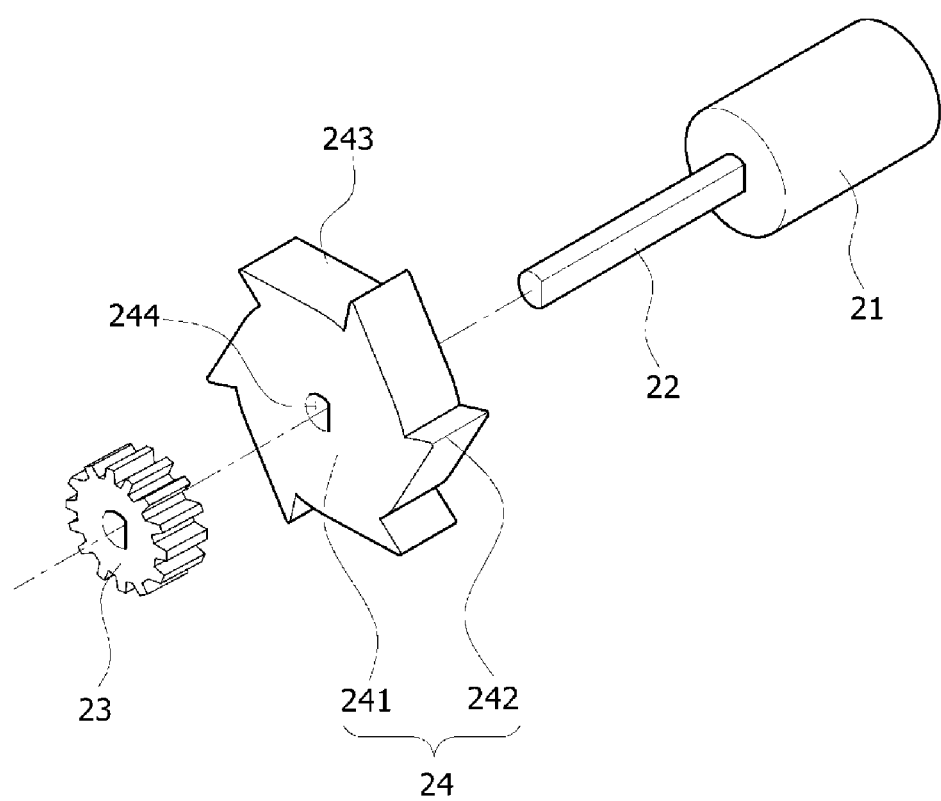
FIG. 3 schematically illustrates a motor unit in the EPB in accordance with the embodiment of the present invention.
Figure 4:
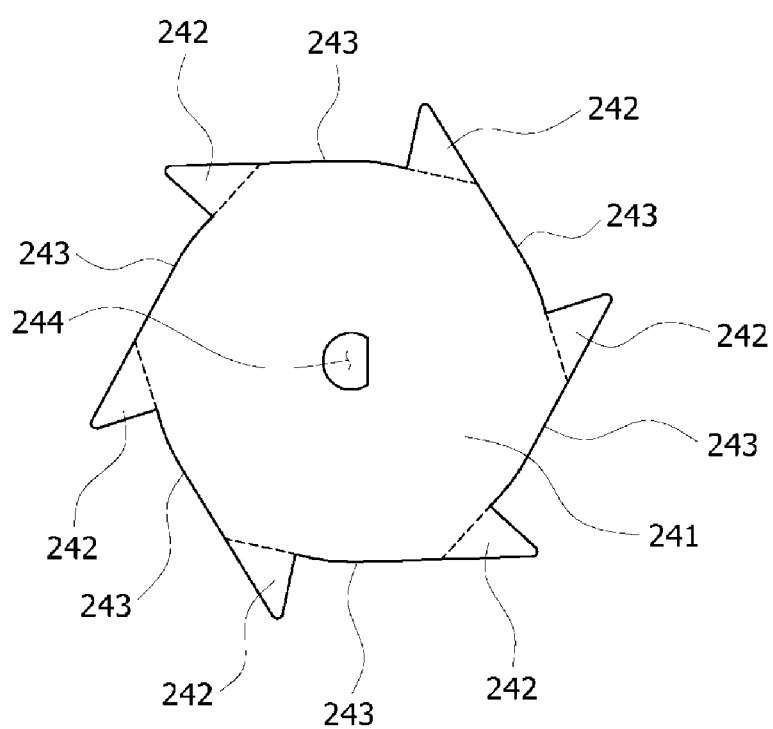
FIG. 4 schematically illustrates a driving plate in the EPB in accordance with the embodiment of the present invention.

FIG. 3 schematically illustrates the motor unit in the EPB in accordance with the embodiment of the present invention. FIG. 4 schematically illustrates a driving plate in the EPB in accordance with the embodiment of the present invention.

Referring to FIGS. 1 to 4, the motor unit 20 in accordance with the embodiment of the present invention may include a driving motor 21, a driving shaft 22, a driving gear 23, and a driving plate 24.

The driving motor 21 may be mounted in the housing unit 10, and driven according to a control signal of the control unit 70. The driving shaft 22 mounted in the driving motor 21 can be rotated in both directions. For example, a parking brake operation may be performed when the driving shaft 22 is rotated in one direction, and released when the driving shaft 22 is rotated in the other direction.

The driving gear 23 may be mounted on the driving shaft 22 and engaged with the deceleration unit 30. For example, the driving gear 23 may be coupled to the driving shaft 22, and protrude in a lateral direction so as to transfer power of the driving shaft 22 to the deceleration unit 30.

The driving plate 24 may be coupled to the driving shaft 22, and rotated in connection with the driving shaft 22. The driving plate 24 may be locked to the locking unit 50 of which the length is increased, and restricted from rotating in the other direction. When the driving plate 24 is restricted from rotating in the other direction, the rotation of the driving shaft 22 coupled to a rotating body 241 through the driving plate 24 or particularly the central part of the rotating body 241 may also be restricted.

The driving plate 24 in accordance with the embodiment of the present invention may include the rotating body 241 and a protruding body 242. The driving shaft 22 may be installed through the central part of the rotating body 241. The rotating body 241 may include a plurality of polygonal surfaces 243 formed at the edge thereof, and thus have a polygonal shape. The protruding body 242 may protrude from an end of each of the polygonal surfaces 243. When the locking unit 50 of which the length is increased is locked to the protruding body 242, the driving plate 24 may be restricted from rotating in the other direction.

The rotating body 241 may have an angled hole 244 formed therein. As the driving shaft 22 is passed through the angled hole 244, the rotating body 241 may be rotated in connection with the driving shaft 22 in a state where the rotating body 241 is coupled to the driving shaft 22. The exterior of the driving shaft 22 may have the same shape as the angled hole 244, and have a shape which is not a circular shape. Thus, the driving shaft 22 may be passed through the angled hole 244, in order to determine the position of the driving shaft 22 or the driving plate 24. In the present embodiment, the exterior of the driving shaft 22 and the angled hole 244 may have a semi-circular shape.

The rotating body 241 may have a hexagonal shape, and the protruding body 242 may be formed at the right end of each of the polygonal surfaces 243. Thus, when the rotating body 241 is rotated in the counterclockwise direction (refer to FIG. 7), the protruding body 242 may be locked to the locking unit 50 of which the length is increased. Thus, the rotation of the driving plate 24 may be restricted. The rotating body 241 may be replaced with another shape such as a pentagonal shape in addition to the hexagonal shape.

Even when the rotation of the rotating body 241 in the counterclockwise direction is restricted by the locking unit 50, the rotating body 241 can be rotated in the clockwise direction. That is, when the rotating body 241 is rotated in the clockwise direction, the driving plate 24 may be rotated while the polygonal surface 243 of the rotating body 241 is not locked to the locking unit 50 but pushes the locking unit 50.

Figure 5:
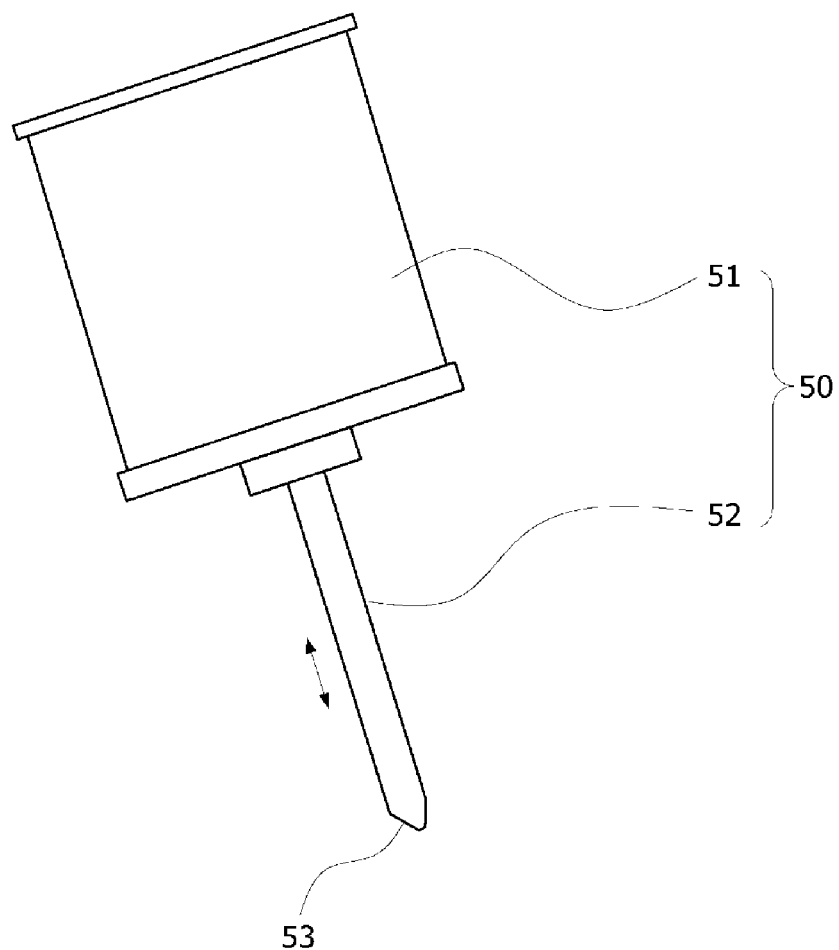
FIG. 5 schematically illustrates a locking unit in the EPB in accordance with the embodiment of the present invention.

FIG. 5 schematically illustrates the locking unit in the EPB in accordance with the embodiment of the present invention.

Referring to FIGS. 1, 2, and 5, the locking unit 50 in accordance with the embodiment of the present invention may include a fixed part 51 and a moving part 52.

The fixed part 51 may be installed in the housing unit 10, and the moving part 52 may be partially mounted in the fixed part 51. The moving part 52 may be advanced from or retreated into the fixed part 51 through the operation of the fixed part 51. Since the moving part 52 is advanced toward the driving plate 24, the protruding body 242 may be locked to the moving part 52 when the moving part 52 is advanced, thereby restricting the rotating body 241 from rotating in the other direction. Thus, the driving plate 24 may be restricted from rotating in the other direction. The locking unit 50 may include a hydraulic piston, an electric actuator, or a solenoid.

The moving part 52 may have a sharp contact part 53 formed at an end thereof. The contact part 53 may be formed in a shape for reducing a frictional force between the moving part 52 and the polygonal surface 243, when the rotating body 241 is additionally rotated in one direction. For example, the contact part 53 may be formed at the end of the moving part 52. Furthermore, in order to reduce a contact area with the polygonal surface 243, the contact part 53 may be sharply formed or have an inclined surface (refer to FIG. 8). The contact part 53 may include a flexible material which can contract when the contact part 53 comes in contact with the polygonal surface 243.

Figure 6:
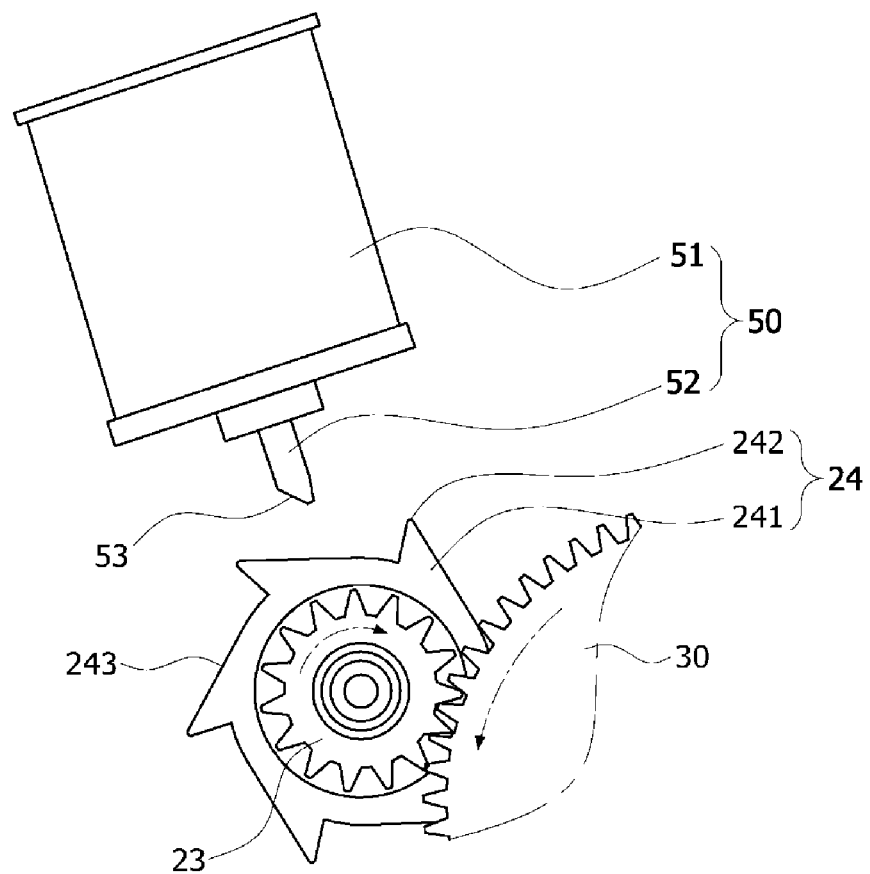
FIG. 6 schematically illustrates a state in which the motor unit is driven to perform a parking brake operation in the EPB in accordance with the embodiment of the present invention.
Figure 7:
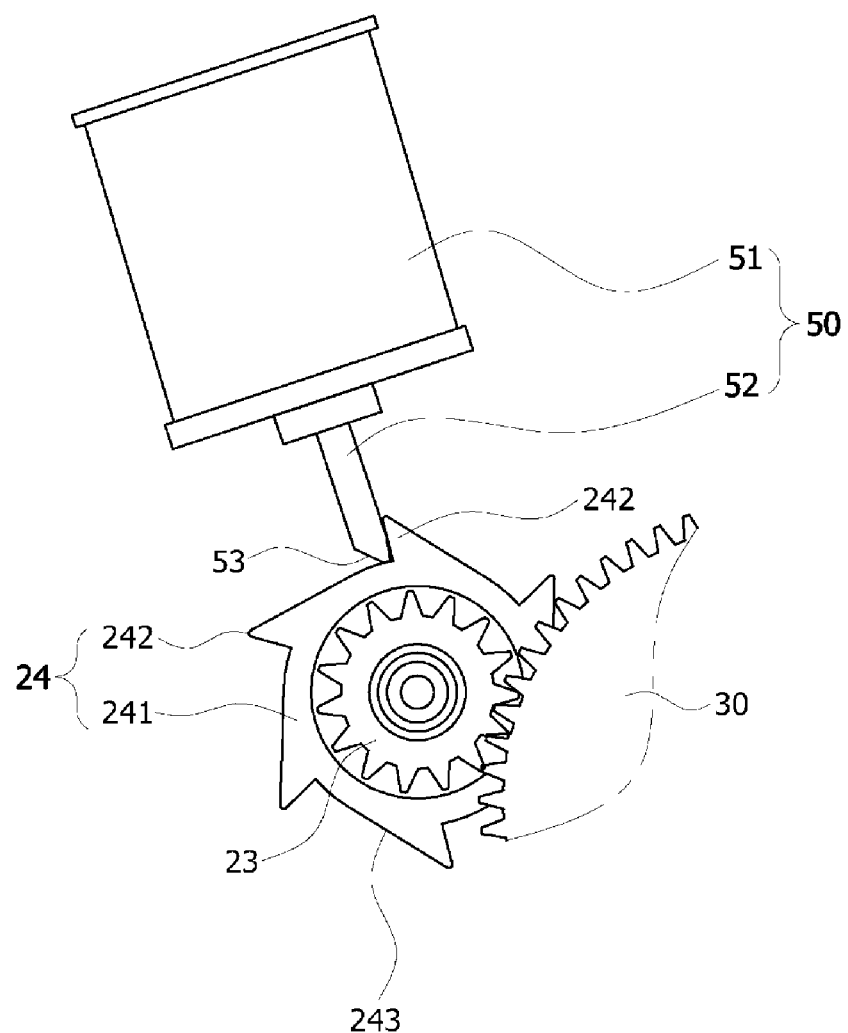
FIG. 7 schematically illustrates a state in which the rotation of the motor unit in the other direction is restricted by the locking unit in the EPB in accordance with the embodiment of the present invention.
Figure 8:
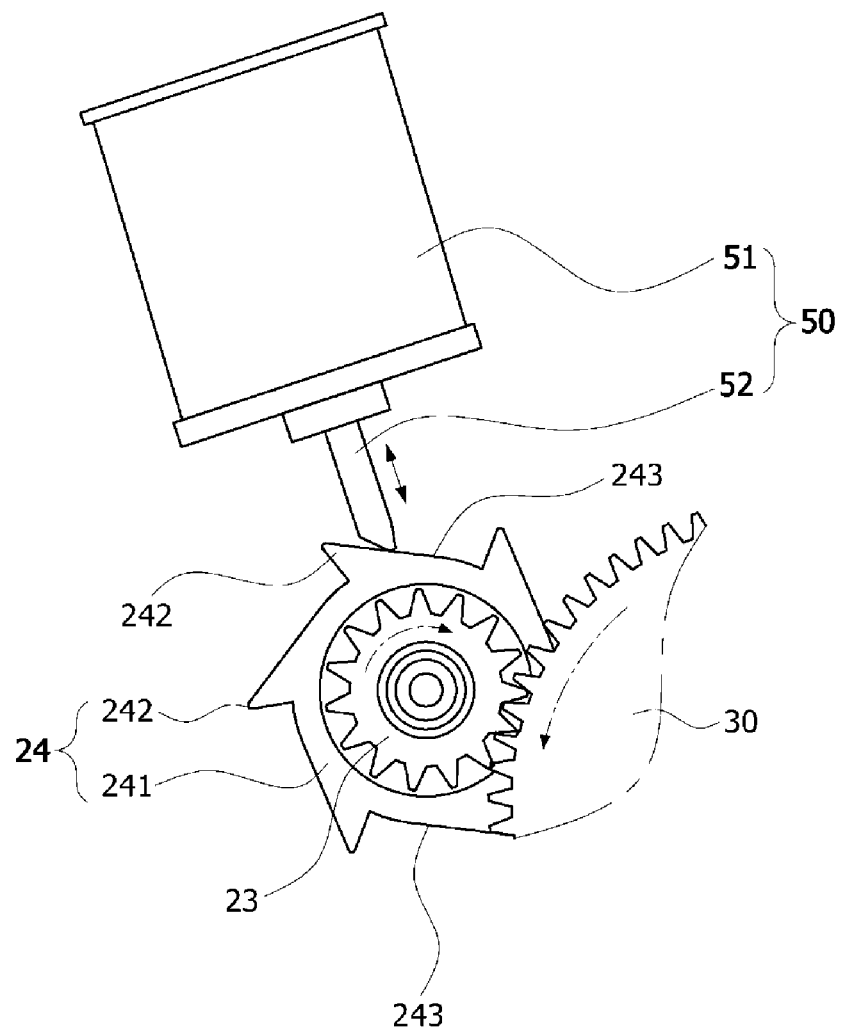
FIG. 8 schematically illustrates a state in which the motor unit is driven again and rotated in one direction in FIG. 7.

FIG. 6 schematically illustrates a state in which the motor unit is driven to perform a parking brake operation in the EPB in accordance with the embodiment of the present invention. FIG. 7 schematically illustrates a state in which the rotation of the motor unit in the other direction is restricted by the locking unit in the EPB in accordance with the embodiment of the present invention. FIG. 8 schematically illustrates a state in which the motor unit is driven again and rotated in one direction in FIG. 7.

Referring to FIGS. 6 to 8, the driving plate 24 may be rotated in the clockwise direction at the initial stage of the parking brake operation. At this time, the rotation of the driving plate 24 in the clockwise direction may be restricted as the protruding body 242 is locked to the moving part 52. Then, when the parking brake operation is additionally required, the driving plate 24 can be rotated in the clockwise direction in a state where the locking unit 50 is not separately driven.

The parking brake operation of the EPB in accordance with the embodiment of the present invention will be described as follows.

When the parking button 80 is operated, the driving motor 21 may be driven during a preset time, according to control of the control unit 70 receiving a parking signal. Then, the driving shaft 22 may be rotated in the clockwise direction. When the driving shaft 22 is rotated, the deceleration unit 30 connected to the driving shaft 22 may transfer power to the screw shaft 41 of the spindle unit 40. When the screw shaft 41 is rotated, the nut piston 42 may be moved to attach the brake pad 100 to the wheel disk 200, thereby performing a parking brake operation (refer to FIG. 6).

When the locking unit 50 is operated according to control of the control unit 70 after the driving motor 21 is driven during the preset time, the moving part 52 may protrude from the fixed part 51 to the rotating body 241 so as to be attached to the polygonal surface 243 of the rotating body 241. At this time, the driving motor 21 may be driven to rotate the rotating body 241 in the counterclockwise direction such that the protruding body 242 is locked to a side surface of the moving part 52. In addition, although the driving motor 21 is not driven, the rotating body 241 may be rotated in the counterclockwise direction until the protruding body 242 is locked to the moving part 52.

That is, when the power generated by the driving motor 21 is removed, the pressurizing force of the brake pad 100 to pressurize the wheel disk 200 may be slowly released to move the nut piston 42 in the opposite direction to during the parking brake operation. At this time, since the deceleration unit 30 is connected to the spindle unit 40, the rotating body 241 connected to the deceleration unit 30 may be rotated in the counterclockwise direction along the movement of the nut piston 42, and the protruding body 242 may be locked to the moving part 52 (refer to FIG. 7). At this time, since the protruding body 242 is locked to the side surface of the moving part 52 so as to restrict the rotation of the rotating body 241, a support force for restricting the rotation of the rotating body 241 can be secured even though the locking unit 50 is reduced in size.

After the driving motor 21 is driven during the preset time, the sensing unit 60 may measure the moving distance of the nut piston 42. When the moving distance of the nut piston 42 does not reach a preset distance, the driving motor 21 may be driven again according to the control of the control unit 70, and rotate the rotating body 241 in the clockwise direction (refer to FIG. 8). That is, although the locking of the locking unit 50 is not released, or although the length of the moving part 52 is not decreased, the driving plate 24 may be slowly rotated in the clockwise direction while the polygonal surface 243 pushes the moving part 52 to the outside when the driving motor 21 is driven. Thus, the pressurizing force of the brake pad 100 can be increased only through the operation of the driving motor 21. This is because, since the polygonal surface 243 comes in contact with the moving part 52 when the driving plate 24 is rotated in the clockwise direction (refer to FIG. 8), the moving part 52 cannot restrict the rotation of the driving plate 24.

On the other hand, when the driving plate 24 is rotated in the counterclockwise direction (refer to FIG. 7), the moving part 52 may restrict the rotation of the driving plate 24 while the protruding body 242 comes in contact with the moving part 52. Therefore, the rotation of the driving shaft 22 coupled to the rotating body 241 through the driving plate 24 or particularly the central part of the rotating body 241 can be restricted.

The EPB 1 in accordance with the embodiment of the present invention may maintain a state in which the protruding body 242 formed outside the rotating body 241 is locked to the locking unit 50 of which the length is increased, such that the brake pad 100 pressurizes the wheel disk 200.

In accordance with the embodiment of the present invention, since the protruding body 242 is locked to the side surface of the locking unit 50, the EPB 1 can maintain a support force for restricting the rotation of the rotating body 241 even though the locking unit 50 is reduced in size.

Furthermore, since the locking unit 50 allows the rotation of the rotating body 241 in one direction but restricts the rotation of the rotating body 241 in the other direction, the EPB 1 can additionally pressurize the brake pad 100 even though the locking of the locking unit 50 is not released.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A parking brake comprising:
   a motor;
   at least one gear operably connected to the motor and configured to transfer power;
   a spindle operably connected to the at least one gear for converting the power to linearly move a brake pad;
   a ratchet wheel operably connected to the at least one gear and configured to rotate as the at least one gear rotates, the ratchet wheel comprising a plurality of teeth arranged on its circumference;
   a stopper comprising an actuator and a stopping rod configured to move toward and away from the ratchet wheel with operation of the actuator;
   a sensor configured to detect displacement indicative of linear movement of the brake pad; and
   a controller configured to generate control signals for operation of the motor and the stopper such that:
      in response to a driver's input for parking brake, the controller causes the motor to start for rotating the at least one gear in a braking direction while the stopping rod is at a non-engaging position in which the stopping rod does not contact the plurality of teeth as the ratchet wheel rotates,
      subsequently while the at least one gear is rotating in the braking direction, the controller causes the actuator to operate for moving the stopping rod toward the ratchet wheel such that the stopping rod extends to an engaging position in which a tip of the stopping rod contacts the plurality of teeth as the ratchet wheel rotates, wherein the plurality of teeth and the tip of the stopping rod are configured to allow rotation of the ratchet wheel when the at least one gear rotates in the braking direction even with the tip of the stopping rod contacting the plurality of teeth, wherein the plurality of teeth and the tip of the stopping rod are configured to inhibit rotation of the ratchet wheel when the tip of the stopping rod contacts one of the plurality of teeth and the at least one gear is to rotate in an unbraking direction that is opposite to the braking direction,
      after a predetermined period subsequent to starting of the motor, the controller causes the sensor to detect displacement indicative of linear movement of the brake pad to determine whether the displacement is smaller than a predetermined distance for completing braking, and
      subsequently when determined that the displacement is smaller than the predetermined distance, the controller causes the motor to run for further rotating the at least one gear in the braking direction such that the ratchet wheel rotates further and then stops, in which the tip of the stopping rod inhibits rotation of the ratchet wheel to prevent the at least one gear from rotating in the unbraking direction.

2. The parking brake of claim 1, further comprising:
   a driving shaft coupled to the motor;
   wherein the at least one gear is mounted on the driving shaft; and
   wherein the ratchet wheel is mounted on the driving shaft such that the rotation of the driving shaft is inhibited when the stopping rod stops the rotation of the ratchet wheel.

3. The parking brake of claim 2, wherein the at least one gear and the ratchet wheel are mounted on the driving shaft, and the ratchet wheel is arranged closer to the driving motor than the at least one gear.

4. The parking brake of claim 2, wherein the driving shaft comprises a keyed surface for engaging with the ratchet wheel.

5. The parking brake of claim 1, wherein the spindle comprises a leadscrew configured to rotate when the at least one gear rotates and a nut engaged with the leadscrew and connected to the brake pad, the nut configured to linearly move when the leadscrew rotates.

6. The parking brake of claim 5, wherein the sensor is configured to detect the displacement of the nut.

7. The parking brake of claim 1, wherein when the tip of the stopping rod contacts the plurality of teeth of the ratchet wheel which rotates, a surface of the ratchet wheel is configured to move the stopping rod.

8. The parking brake of claim 1, wherein the controller is further configured to control the motor and the actuator such that the stopping rod is retracted to the non-engaging position and the motor runs to rotate the at least one gear in the unbraking direction.

* * * * *